(12) United States Patent
Matsuoka

(10) Patent No.: US 9,292,907 B2
(45) Date of Patent: Mar. 22, 2016

(54) IMAGE PROCESSING APPARATUS AND IMAGE PROCESSING METHOD

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 14/021,987

(22) Filed: Sep. 9, 2013

(65) Prior Publication Data

US 2014/0072241 A1 Mar. 13, 2014

(30) Foreign Application Priority Data

Sep. 12, 2012 (JP) .................................. 2012-200300

(51) Int. Cl.
*G06T 5/00* (2006.01)
*G06T 7/20* (2006.01)

(52) U.S. Cl.
CPC .............. *G06T 5/002* (2013.01); *G06T 7/2013* (2013.01); *G06T 2207/10016* (2013.01); *G06T 2207/20201* (2013.01)

(58) Field of Classification Search
CPC ................. G06T 5/002; G06T 7/2013; G06T 2207/10016; G06T 2207/20201
USPC ............... 382/107, 255, 278; 348/208.6, 699; 348/247; 375/240.16
See application file for complete search history.

(56) References Cited

U.S. PATENT DOCUMENTS

| 5,782,766 | A * | 7/1998 | Weng | A61B 8/463 128/916 |
| 8,233,062 | B2 * | 7/2012 | Mitsuya | G06T 5/50 348/241 |
| 8,446,957 | B2 * | 5/2013 | Kurata | G06T 7/2026 375/240.16 |
| 2004/0247028 | A1 * | 12/2004 | Kim | G06T 7/202 375/240.16 |
| 2005/0025342 | A1 * | 2/2005 | Lee | G06T 7/2006 382/107 |
| 2007/0140591 | A1 * | 6/2007 | Kurata | G06T 7/2013 382/278 |
| 2008/0175439 | A1 * | 7/2008 | Kurata | G06T 7/2013 382/107 |
| 2008/0175510 | A1 * | 7/2008 | Matsushita | H04N 1/409 382/260 |
| 2009/0232216 | A1 * | 9/2009 | Kurata | G06T 7/2013 375/240.16 |
| 2009/0257498 | A1 * | 10/2009 | Kurata | G06T 7/2026 375/240.16 |
| 2010/0020244 | A1 * | 1/2010 | Mitsuya | G06T 7/2026 348/699 |
| 2010/0033584 | A1 * | 2/2010 | Watanabe | G06T 3/0062 348/208.13 |
| 2010/0188535 | A1 * | 7/2010 | Mitsuya | G06T 5/50 348/241 |

FOREIGN PATENT DOCUMENTS

JP P2009-258868 A 11/2009

* cited by examiner

*Primary Examiner* — Mekonen Bekele
(74) *Attorney, Agent, or Firm* — Canon U.S.A., Inc. IP Division

(57) ABSTRACT

An image processing apparatus includes a correlation value map generation unit configured to generate a correlation value map by setting a target block, having a predetermined size and including a plurality of pixels, on a target image, and obtaining correlation values with a plurality of reference blocks corresponding to a target block set on a reference image different from the target image. The image processing apparatus also includes a detection unit configured to detect deviation between a reference block having a maximum correlation with the target block from the correlation value map, and the target block, as a motion vector of the target block, and a reliability evaluation unit configured to evaluate reliability of the motion vector by evaluating whether a distribution of correlation values whose correlation are local maximum is linear from the correlation value map.

7 Claims, 14 Drawing Sheets

FIG.4

|     | -10 | -9  | -8  | -7  | -6  | -5  | -4  | -3  | -2  | -1  | 0   | 1   | 2   | 3   | 4   | 5   | 6   | 7   | 8   | 9   | 10  |
|-----|-----|-----|-----|-----|-----|-----|-----|-----|-----|-----|-----|-----|-----|-----|-----|-----|-----|-----|-----|-----|-----|
| -10 | 215 | 222 | 229 | 237 | 244 | 252 | 260 | 268 | 276 | 284 | 293 | 302 | 311 | 320 | 329 | 338 | 349 | 361 | 373 | 385 | 397 |
| -9  | 177 | 183 | 190 | 196 | 203 | 210 | 217 | 224 | 232 | 239 | 247 | 255 | 263 | 271 | 279 | 288 | 299 | 310 | 321 | 332 | 343 |
| -8  | 143 | 148 | 154 | 160 | 166 | 172 | 178 | 185 | 191 | 198 | 205 | 212 | 219 | 227 | 234 | 242 | 252 | 262 | 272 | 282 | 293 |
| -7  | 113 | 118 | 123 | 128 | 133 | 138 | 143 | 149 | 155 | 161 | 167 | 173 | 180 | 186 | 193 | 200 | 209 | 218 | 228 | 237 | 247 |
| -6  | 87  | 91  | 95  | 99  | 103 | 108 | 113 | 118 | 123 | 128 | 133 | 138 | 144 | 150 | 156 | 162 | 170 | 179 | 187 | 196 | 205 |
| -5  | 65  | 68  | 71  | 75  | 78  | 82  | 86  | 90  | 94  | 98  | 103 | 108 | 113 | 118 | 123 | 128 | 135 | 143 | 151 | 159 | 167 |
| -4  | 47  | 49  | 52  | 54  | 57  | 60  | 63  | 66  | 70  | 73  | 77  | 81  | 85  | 89  | 93  | 98  | 105 | 112 | 119 | 126 | 133 |
| -3  | 33  | 34  | 36  | 38  | 40  | 42  | 44  | 47  | 49  | 52  | 55  | 58  | 61  | 65  | 68  | 72  | 78  | 84  | 90  | 96  | 103 |
| -2  | 23  | 24  | 25  | 26  | 27  | 28  | 29  | 31  | 33  | 35  | 37  | 39  | 42  | 44  | 47  | 50  | 55  | 60  | 66  | 71  | 77  |
| -1  | 17  | 17  | 17  | 17  | 17  | 18  | 19  | 20  | 21  | 22  | 23  | 24  | 26  | 28  | 30  | 32  | 36  | 41  | 45  | 50  | 55  |
| 0   | 15  | 14  | 13  | 13  | 12  | 12  | 12  | 12  | 12  | 12  | 13  | 14  | 15  | 16  | 17  | 18  | 21  | 25  | 29  | 33  | 37  |
| 1   | 17  | 15  | 14  | 12  | 11  | 10  | 9   | 8   | 8   | 7   | 7   | 7   | 7   | 7   | 7   | 8   | 11  | 14  | 17  | 20  | 23  |
| 2   | 23  | 20  | 18  | 16  | 14  | 12  | 10  | 9   | 7   | 6   | 5   | 4   | 3   | 3   | 2   | 2   | 4   | 6   | 8   | 10  | 13  |
| 3   | 33  | 30  | 27  | 24  | 21  | 18  | 15  | 13  | 11  | 9   | 7   | 5   | 4   | 2   | 1   | 0   | 1   | 2   | 4   | 5   | 7   |
| 4   | 47  | 43  | 39  | 35  | 31  | 28  | 25  | 22  | 19  | 16  | 13  | 10  | 8   | 6   | 4   | 2   | 2   | 3   | 3   | 4   | 5   |
| 5   | 65  | 60  | 55  | 51  | 46  | 42  | 38  | 34  | 30  | 26  | 23  | 20  | 17  | 14  | 11  | 8   | 7   | 7   | 7   | 7   | 7   |
| 6   | 87  | 81  | 76  | 70  | 65  | 60  | 55  | 50  | 46  | 41  | 37  | 33  | 29  | 25  | 21  | 18  | 17  | 16  | 15  | 14  | 13  |
| 7   | 113 | 106 | 100 | 94  | 88  | 82  | 76  | 71  | 65  | 60  | 55  | 50  | 45  | 41  | 36  | 32  | 30  | 28  | 26  | 24  | 23  |
| 8   | 143 | 136 | 129 | 122 | 115 | 108 | 101 | 95  | 89  | 83  | 77  | 71  | 66  | 60  | 55  | 50  | 47  | 44  | 42  | 39  | 37  |
| 9   | 177 | 169 | 161 | 153 | 145 | 138 | 131 | 124 | 117 | 110 | 103 | 96  | 90  | 84  | 78  | 72  | 68  | 65  | 61  | 58  | 55  |
| 10  | 215 | 206 | 197 | 189 | 180 | 172 | 164 | 156 | 148 | 140 | 133 | 126 | 119 | 112 | 105 | 98  | 93  | 89  | 85  | 81  | 77  |

FIG.7

|   | -10 | -9 | -8 | -7 | -6 | -5 | -4 | -3 | -2 | -1 | 0 | 1 | 2 | 3 | 4 | 5 | 6 | 7 | 8 | 9 | 10 |
|---|---|---|---|---|---|---|---|---|---|---|---|---|---|---|---|---|---|---|---|---|---|
| -10 | 215 | 222 | 229 | 237 | 244 | 252 | 260 | 268 | 276 | 284 | 293 | 302 | 311 | 320 | 329 | 338 | 349 | 361 | 373 | 385 | 397 |
| -9 | 177 | 183 | 190 | 196 | 203 | 210 | 217 | 224 | 232 | 239 | 247 | 255 | 263 | 271 | 279 | 288 | 299 | 310 | 321 | 332 | 343 |
| -8 | 143 | 148 | 154 | 160 | 166 | 172 | 178 | 185 | 191 | 198 | 205 | 212 | 219 | 227 | 234 | 242 | 252 | 262 | 272 | 282 | 293 |
| -7 | 113 | 118 | 123 | 128 | 133 | 138 | 143 | 149 | 155 | 161 | 167 | 173 | 180 | 186 | 193 | 200 | 209 | 218 | 228 | 237 | 247 |
| -6 | 87 | 91 | 95 | 99 | 103 | 108 | 113 | 118 | 123 | 128 | 133 | 138 | 144 | 150 | 156 | 162 | 170 | 179 | 187 | 196 | 205 |
| -5 | 65 | 68 | 71 | 75 | 78 | 82 | 86 | 90 | 94 | 98 | 103 | 108 | 113 | 118 | 123 | 128 | 135 | 143 | 151 | 159 | 167 |
| -4 | 47 | 49 | 52 | 54 | 57 | 60 | 63 | 66 | 70 | 73 | 77 | 81 | 85 | 89 | 93 | 98 | 105 | 112 | 119 | 126 | 133 |
| -3 | 33 | 34 | 36 | 38 | 40 | 42 | 44 | 47 | 49 | 52 | 55 | 58 | 61 | 65 | 68 | 72 | 78 | 84 | 90 | 96 | 103 |
| -2 | 23 | 24 | 25 | 26 | 27 | 28 | 29 | 31 | 33 | 35 | 37 | 39 | 42 | 44 | 47 | 50 | 55 | 60 | 66 | 71 | 77 |
| -1 | 17 | 17 | 17 | 17 | 17 | 18 | 19 | 20 | 21 | 22 | 23 | 24 | 26 | 28 | 30 | 32 | 36 | 41 | 45 | 50 | 55 |
| 0 | 15 | 14 | 13 | 13 | 12 | 12 | 12 | 12 | 12 | 12 | 13 | 14 | 15 | 16 | 17 | 18 | 21 | 25 | 29 | 33 | 37 |
| 1 | 17 | 15 | 14 | 12 | 11 | 10 | 9 | 8 | 8 | 7 | 7 | 7 | 7 | 7 | 7 | 8 | 11 | 14 | 17 | 20 | 23 |
| 2 | 23 | 20 | 18 | 16 | 14 | 12 | 10 | 9 | 7 | 6 | 5 | 4 | 3 | 3 | 2 | 2 | 4 | 6 | 8 | 10 | 13 |
| 3 | 33 | 30 | 27 | 24 | 21 | 18 | 15 | 13 | 11 | 9 | 7 | 5 | 4 | 2 | 1 | 0 | 1 | 2 | 4 | 5 | 7 |
| 4 | 47 | 43 | 39 | 35 | 31 | 28 | 25 | 22 | 19 | 16 | 13 | 10 | 8 | 6 | 4 | 2 | 2 | 3 | 3 | 4 | 5 |
| 5 | 65 | 60 | 55 | 51 | 46 | 42 | 38 | 34 | 30 | 26 | 23 | 20 | 17 | 14 | 11 | 8 | 7 | 7 | 7 | 7 | 7 |
| 6 | 87 | 81 | 76 | 70 | 65 | 60 | 55 | 50 | 46 | 41 | 37 | 33 | 29 | 25 | 21 | 18 | 17 | 16 | 15 | 14 | 13 |
| 7 | 113 | 106 | 100 | 94 | 88 | 82 | 76 | 71 | 65 | 60 | 55 | 50 | 45 | 41 | 36 | 32 | 30 | 28 | 26 | 24 | 23 |
| 8 | 143 | 136 | 129 | 122 | 115 | 108 | 101 | 95 | 89 | 83 | 77 | 71 | 66 | 60 | 55 | 50 | 47 | 44 | 42 | 39 | 37 |
| 9 | 177 | 169 | 161 | 153 | 145 | 138 | 131 | 124 | 117 | 110 | 103 | 96 | 90 | 84 | 78 | 72 | 68 | 65 | 61 | 58 | 55 |
| 10 | 215 | 206 | 197 | 189 | 180 | 172 | 164 | 156 | 148 | 140 | 133 | 126 | 119 | 112 | 105 | 98 | 93 | 89 | 85 | 81 | 77 |

906  905  907

X DIRECTION
Y DIRECTION

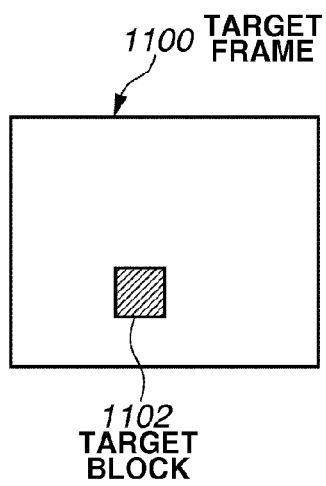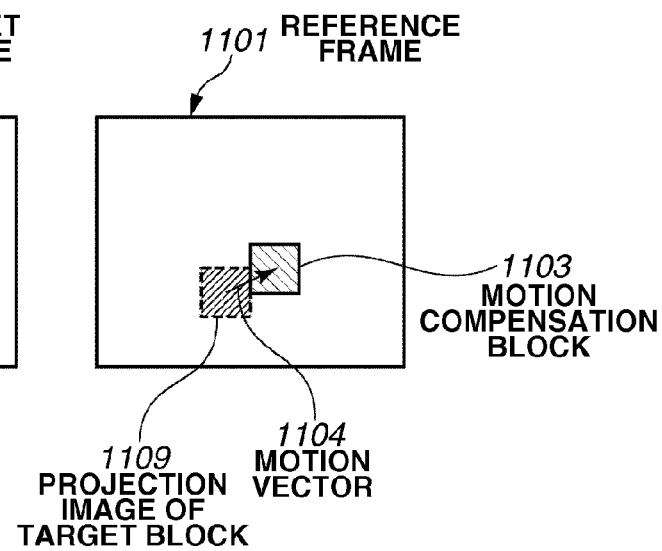

IMAGE PROCESSING APPARATUS AND IMAGE PROCESSING METHOD

BACKGROUND OF THE INVENTION

1. Field of the Invention

The present invention relates to a technology of correcting deviation of an object image generated in a captured image.

2. Description of the Related Art

Today, in many cases, an imaging apparatus such as a digital camera has various hand shake correction functions to prevent deviation of an object image caused by motion of the imaging apparatus, for example user's hand shake, during image capturing. The hand shake correction technology is largely divided into optical hand shake correction and electronic hand shake correction. In the electronic hand shake correction, deviation of the object image is corrected as to a plurality of captured images. Japanese Laid-Open Patent Application No. 2009-258868 discusses a technology of correcting deviation of the object image by performing feature pattern matching between two captured images to calculate a plurality of motion vectors, and estimating deviation correction parameters from the motion vectors.

SUMMARY OF THE INVENTION

The present invention is directed to an image processing apparatus capable of correctly evaluating a motion vector of a liner object image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a diagram illustrating a sum of absolute differences (SAD) table according to the exemplary embodiment.

FIG. 7 is a diagram illustrating the SAD table.

FIGS. 9A and 9B are diagrams illustrating block matching processing.

DESCRIPTION OF THE EMBODIMENTS

Various exemplary embodiments, features, and aspects of the invention will be described in detail below with reference to the drawings. The exemplary embodiment will be described by way of example of an image processing apparatus, specifically, a digital camera capable of correcting deviation of an object image caused by motion of an imaging apparatus in a captured image, to which the present invention is applied.

Figure 1:
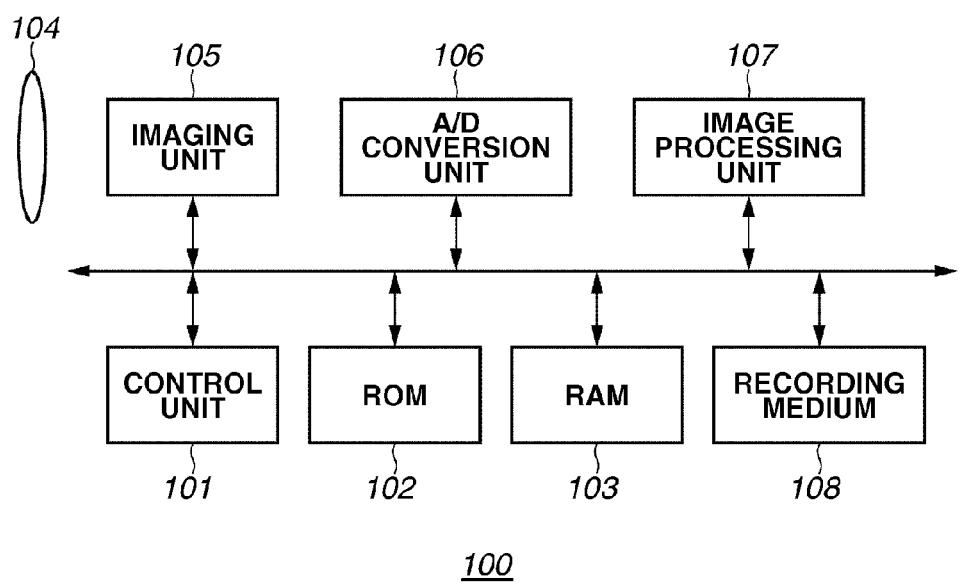
FIG. 1 is a block diagram illustrating a functional configuration of a digital camera according to an exemplary embodiment of the present invention.

FIG. 1 is a block diagram illustrating a functional configuration of a digital camera according to the exemplary embodiment of the present invention. A control unit 101 is, for example, a central processing unit (CPU). The control unit 101 controls an operation of each block included in a digital camera 100 by reading an operation program of each block included in the digital camera 100 from a read-only memory (ROM) 102, and rasterizing and executing the program in a random access memory (RAM) 103. The ROM 102 is a nonvolatile memory in which rewriting is inhibited. The ROM 102 stores a parameter necessary for the operation of each block in addition to the operation program of each block included in the digital camera 100. The RAM 103 is a rewritable volatile memory. The RAM 103 is used as a temporary storage region of data output during the operation of each block included in the digital camera 100. According to the present exemplary embodiment, the RAM 103 temporarily stores a target image necessary for detecting deviation of an object image in a reference image caused by motion of the imaging apparatus, or the reference image yet to be corrected.

An imaging unit 105 is an image sensor such as a charge coupled device (CCD) or a complementary metal-oxide semiconductor (CMOS) sensor. The imaging unit 105 photoelectrically converts an optical image formed on the image sensor by an optical system 104, and outputs an obtained analog image signal to an analog/digital (A/D) conversion unit 106. The A/D conversion unit 106 subjects the input analog image signal to A/D conversion processing, and outputs and stores obtained digital image data (image data) in the RAM 103.

Figure 2:
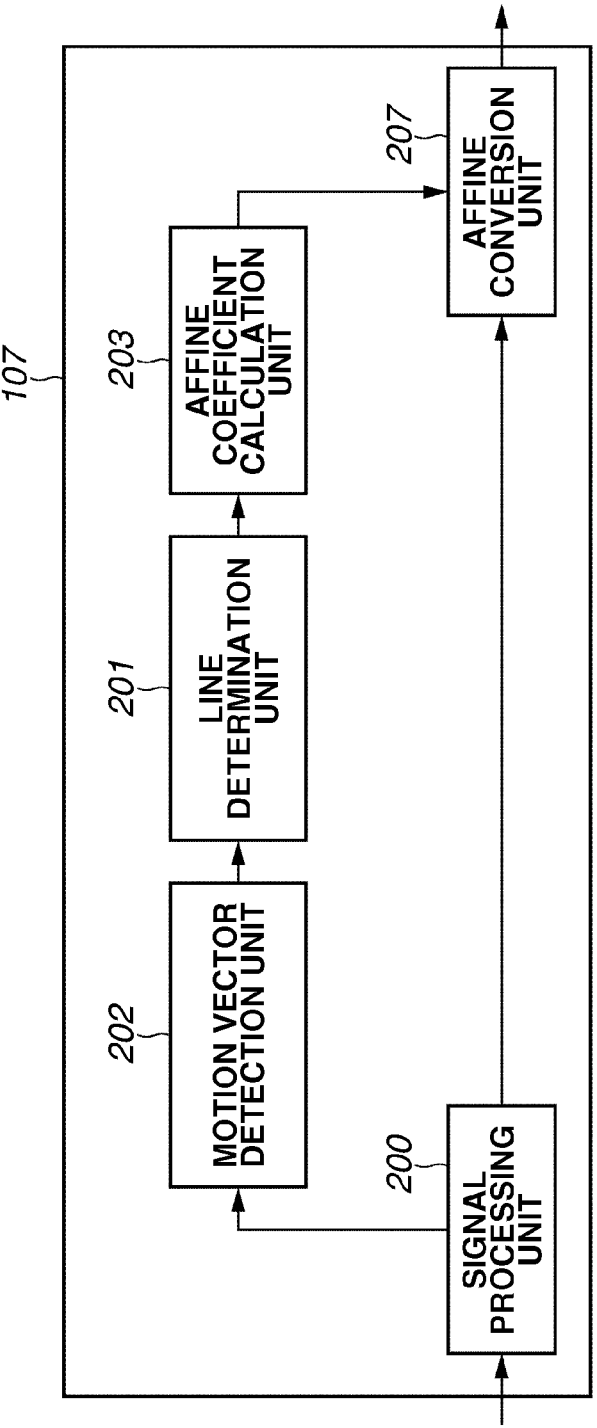
FIG. 2 is a block diagram illustrating a functional configuration of an image processing unit according to the exemplary embodiment.

An image processing unit 107 performs various image processes on image data read from the RAM 103, the ROM 102, or a recording medium 108. For example, the image processing unit 107 performs correction processing such as shading correction or white balance correction, development processing, gamma correction processing, and color conversion processing on image data of an output state from the A/D conversion unit 106. In the present exemplary embodiment, processing for correcting deviation of the object image caused by motion of the digital camera 100 during image capturing is also performed by the image processing unit 107. FIG. 2 is a block diagram illustrating especially a block of the image processing unit 107 relating to the processing for correcting deviation of the object image in detail. To detect the deviation of the object image caused by the motion of the digital camera 100 during the image capturing, a reference image as a target of correction to detect the deviation and a target image as a reference for correction are input to the image processing unit 107. The target image and the reference image are read from the RAM 103 by the control unit 101, and input to the image processing unit 107. A signal processing unit 200 performs various image processes described above.

These image processes can be performed after the correction processing for correcting the deviation of the object image is carried out. In other words, these image processes can be arranged at a latter state after an affine transformation unit 207.

A motion vector detection unit 202 detects a motion vector of the object image in the reference image for each target block. Specifically, the motion vector detection unit 202 compares the target image with the object image in a region near the reference image. The motion vector detection unit 202 detects a motion vector from movement of images of the same pattern between images by, for example, a block matching method similar to that discussed in Japanese Laid-Open Patent Application No. 2009-258868.

Figure 6:
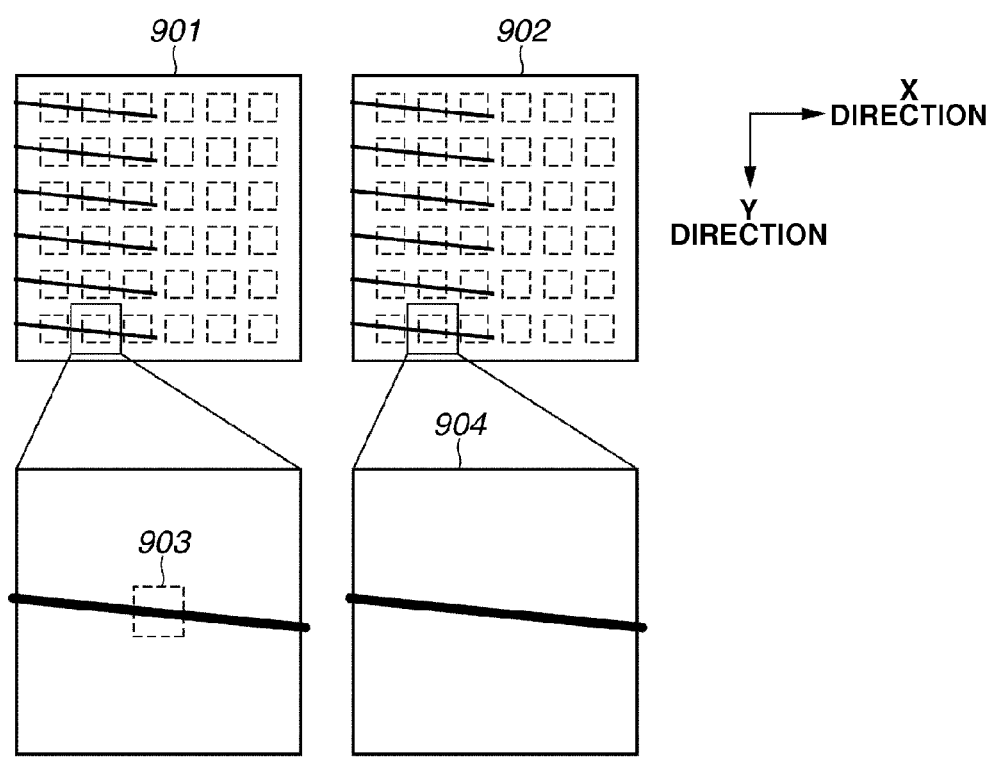
FIG. 6 is a diagram illustrating a target image and a reference image.
Figure 8:
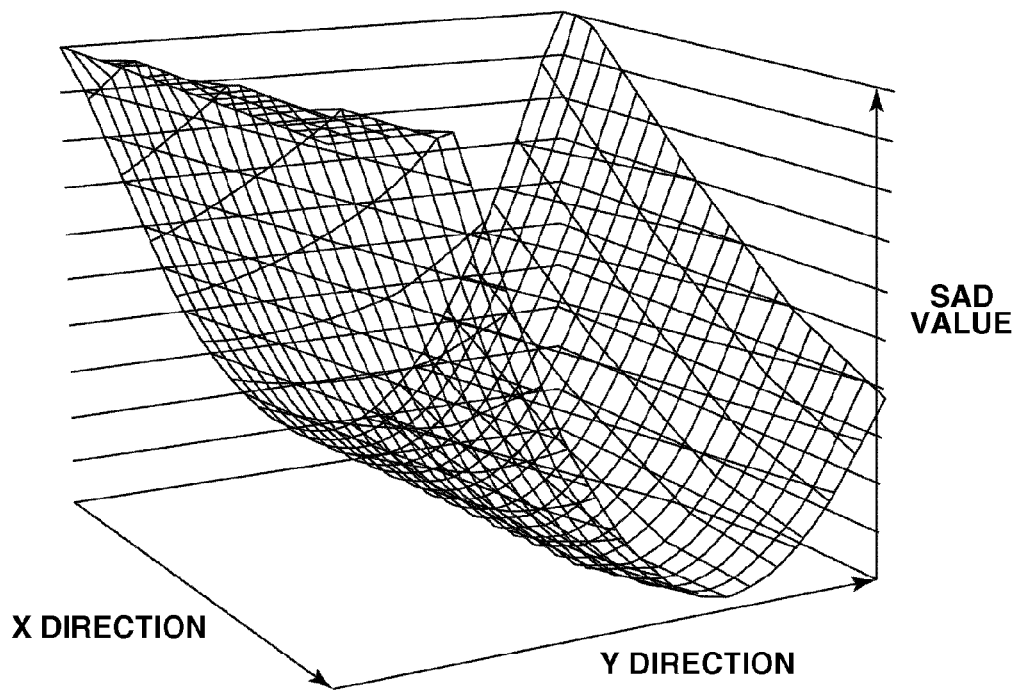
FIG. 8 is a three-dimensional illustration of the SAD table.

FIG. 6 illustrates processing when a motion vector of a linear object is calculated. A target frame 901 is a target frame (target image) that is a reference for motion vector calculation. A reference frame 902 is a reference frame (reference image) that is a target of motion vector calculation. Further, a target block 903 is a target block that is a reference for block matching. A SAD table is generated by performing block matching processing for a search range 904 set in the reference frame. FIG. 7 illustrates the generated SAD table. A horizontal axis indicates a deviation amount in an X axis, a vertical axis indicates a deviation amount in a Y direction, and a value in a square is a SAD value corresponding to each reference block. FIG. 8 three-dimensionally displays the SAD table illustrated in FIG. 7.

The target block 903 is a linear pattern. Thus, many similar patterns are detected along the linear object within the search range on the reference frame. As a result, since no corresponding block can be identified within the search range, the motion vector cannot be correctly detected.

In other words, in the SAD table, a portion of a low SAD value (portion of high correlation) appears in a groove shape as illustrated in FIG. 8. Thus, since it cannot be identified which position of the groove is a correct position of a corresponding block, the motion vector cannot be correctly detected.

However, one minimal minimum value may be generated on the SAD table due to noise in the image. In such a case, while the motion vector cannot be correctly detected, the motion vector is detected as a correct motion vector. The SAD table illustrated in FIG. 7 includes an erroneously detected motion vector 905, a position 906 of a target block, and a position 907 of a minimal minimum value of the SAD value. In FIG. 7, the SAD values on the groove all indicate the strength of similar correlation. However, correlation at the position 907 is slightly stronger than those around. Thus, the value becomes a minimal minimum value to be detected as a correct motion vector. However, since the correlation is stronger than those of the surrounding SAD values because of noise in the image, the value is not actually a SAD value of the strongest (maximum) correlation.

Thus, according to the present exemplary embodiment, whether the object is a linear object is determined, and regarded as one of the factors in considering reliability of the obtained motion vector.

FIGS. 9A to 14 illustrate a block matching method according to the present exemplary embodiment. For example, as illustrated in FIG. 9A, in a target frame 1100, a block (target block) 1102 of a rectangular region of a predetermined size including a plurality of pixels and a plurality of lines, in a horizontal direction and a vertical direction, respectively, is assumed.

In block matching, a block having high correlativity with the target block 1102 is searched for in a reference frame 1101. A reference block 1103 having highest correlativity illustrated in FIG. 9B which is detected in the reference frame 1101 as a result of the searching is referred to as a motion compensation block. A positional deviation amount between the target block 1102 and the motion compensation block 1103 (reference block having highest correlativity) is referred to as a motion vector 1104 (see FIG. 9B).

The motion vector 1104 corresponding to positional deviation (including positional deviation amount and positional deviation direction) between the target block 1102 and the motion compensation block 1103 will be discussed. In the reference frame 1101, a projection image block 1109 of the target block 1102 is assumed at the same position as that of each target block 1102 of the target frame 1100. This case corresponds to positional deviation between a position (e.g., center position) of the projection image block 1109 of the target block and a position (e.g., center position) of the motion compensation block 1103, including a positional deviation amount and a positional deviation direction component.

An outline of the block matching processing will be described. As indicated by a dotted line illustrated in FIG. 10, in the reference frame 1101, the projection image block 1109 of the target block 1102 is assumed at the same position as that of the target block 1102 of the target frame 1100. Coordinates of the center of the projection image block 1109 of the target block 1102 are set as a motion detection origin 1105. Then, assuming that the motion vector 1104 is present within a given range from the motion detection origin 1105, a predetermined range around the motion detection origin 1105 is set as a search range 1106 indicated by a chain line illustrated in FIG. 10.

Then, a block (reference block) 1108 having a size equal to that of the target block 1102 is set on a reference screen. A position of the reference block 1108 is moved, within the set search range 1106, for example, by one pixel or a plurality of pixels in a horizontal direction and a vertical direction. Accordingly, within the search range 1106, a plurality of reference blocks 1108 is set.

In this example, the motion detection origin 105 is a center position of the target block. Thus, moving the reference block 1108 within the search range 1106 means that a center position of the reference block 1108 is moved within the search range 1106. Pixels constituting the reference block 1108 may not be accommodated within the search range 1106.

Figure 10:
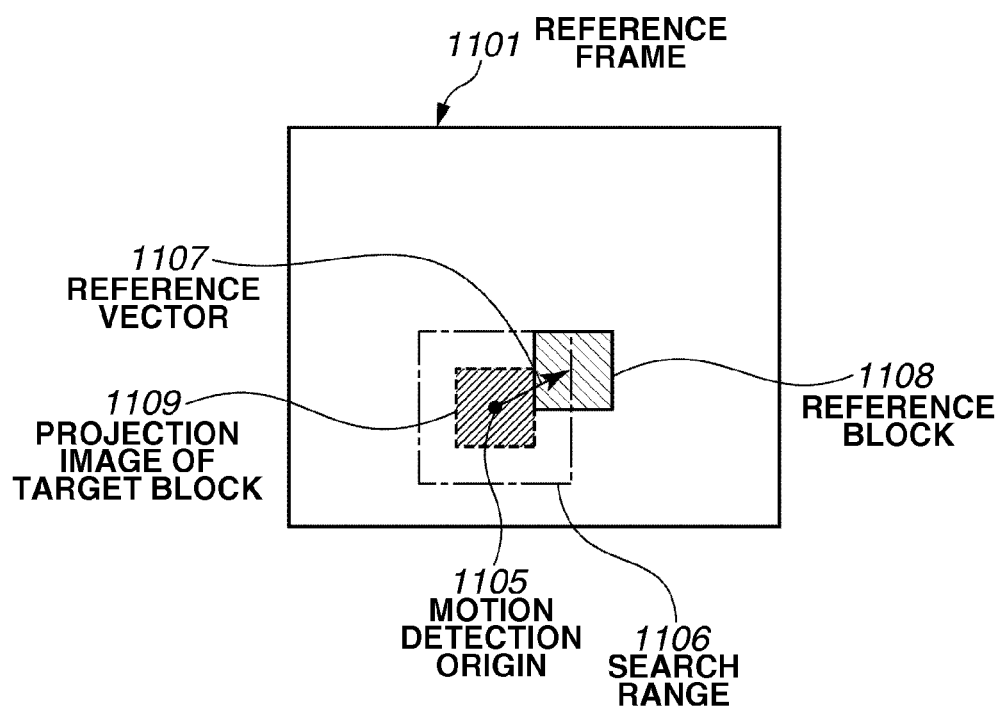
FIG. 10 is a diagram illustrating block matching processing.

Within the search range, for each reference block 1108 to be set, a vector (reference vector) 1107 illustrated in FIG. 10 is set indicating a positional deviation amount and a positional deviation direction between each reference block 1108 and the target block 1102. Correlativity between an image content of the reference block 1108 present at a position indicated by the reference vector 1107 and an image content of the target block 1102 is evaluated.

Figure 11:
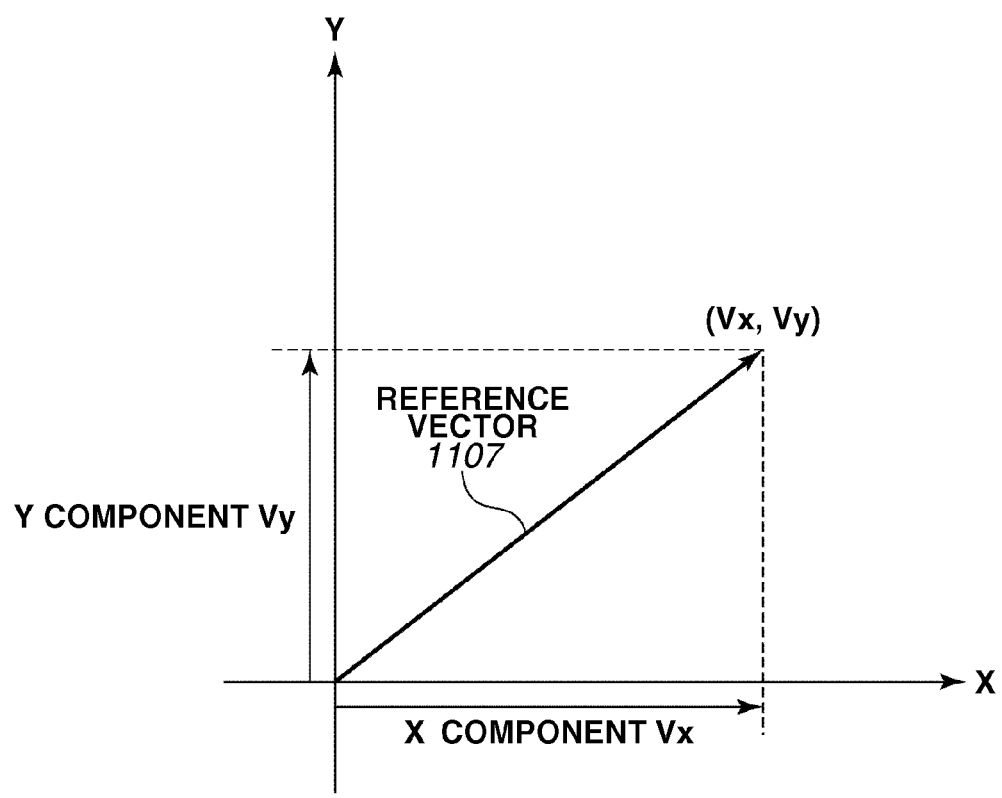
FIG. 11 is a diagram illustrating a reference vector in the block matching processing.

As illustrated in FIG. 11, the reference vector 1107 can be represented by a vector (Vx, Vy) where Vx is a horizontal-direction (X direction) positional deviation amount of the reference block 1108 and Vy is a vertical-direction (Y direction) positional deviation amount. When positional coordinates (e.g., center positional coordinates) of the reference block 1108 and positional coordinates (e.g., center positional coordinates) of the target block 1102 are similar, the reference vector 1107 is represented by a vector (0, 0).

Figure 12:
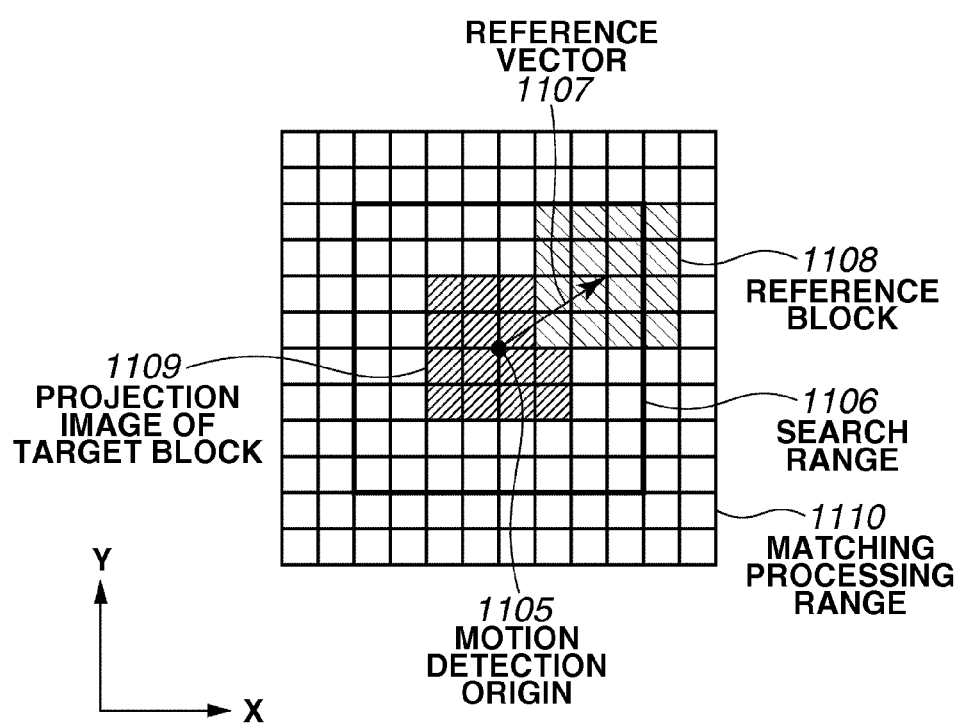
FIG. 12 is a diagram illustrating a reference vector in the block matching processing.

For example, when the reference block 1108 is present at a position shifted from the position of the target block 1102 by one pixel in the X direction, the reference vector 1107 is represented by a vector (1, 0). As illustrated in FIG. 12, when the reference block 1108 is present at a position shifted from the position of the target block 1102 by three pixels in the X direction and two pixels in the Y direction, the reference vector 1107 is represented by a vector (3, 2).

In other words, as in the case of the example illustrated in FIG. 12, the reference vector 1107 means positional deviation (vector including positional deviation amount and positional deviation direction) between each corresponding reference block 1108 and the target block 1102. In FIG. 12, the positions of the target block 1102 and the reference block 1108 are center positions of the respective blocks.

The reference block 1108 moves within the search range 1106. In this case, the center position of the reference block 1108 moves within the search range 1106. The reference block 1108 includes pluralities of pixels in the horizontal direction and the vertical direction. Thus, as illustrated in FIG. 12, a maximum range within which the target block 1102 and the reference block 1108 to be subjected to block matching processing move, is a matching processing range 1110 wider than the search range 1106.

A position of the reference block 1108 detected as a block having a strongest (maximum) correlation with the image content of the target block 1102 is detected as a position (position after movement) of the target block 1102 of the target block 1100 in the reference frame 1101. The detected reference block is set as the motion compensation block 1103. Then, a positional deviation amount between the position of the detected motion compensation block 1103 and the position of the target block 1102 is detected as a motion vector 1104 indicating an amount including a direction component illustrated in FIG. 9B.

A correlation value indicating strength of a correlation between the target block 1102 and the reference block 1108 moved within the search range 1106 is basically calculated by using corresponding pixel values of the target block 1102 and the reference block 1108. As a calculation method, a method using a mean square and other various methods have been offered.

Figure 13:
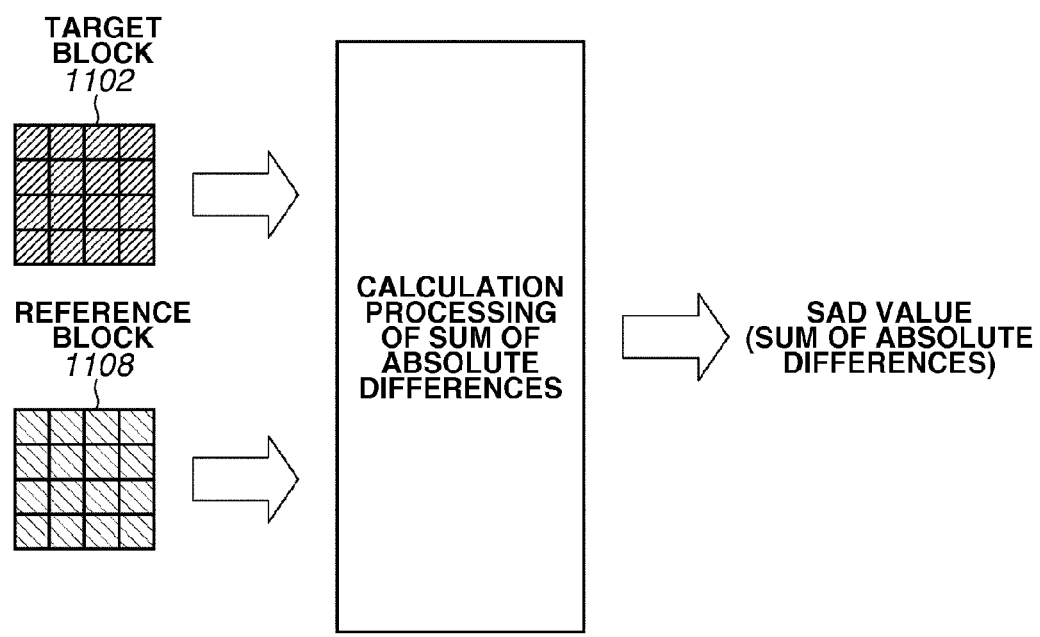
FIG. 13 is a diagram illustrating a SAD value in the block matching processing.

As the correlation value used for calculating the motion vector, for example, a sum of absolute values of differences between luminance values of the pixels in the target block 1102 and luminance values of the corresponding pixels in the reference block 1106 with respect to all the pixels in the blocks illustrated in FIG. 13 is used. The sum of absolute values of differences will be referred to as a sum of absolute differences (SAD).

When the SAD value is used as the correlation value, the smaller the SAD value, the stronger a correlation. Accordingly, among the reference blocks 1108 moved within the search range 1106, a reference block 1108 at a position where the SAD value is at a minimum value is a strongest correlation reference block having a strongest correlation. This strongest correlation reference block is detected as a motion compensation block 1103, and a positional deviation amount of the detected motion compensation block 1103 from the position of the target block 1102 is detected as a motion vector.

As described above, in the block matching, the positional deviation amount of each of the plurality of reference blocks 1108 set within the search range 1106 from the position of the target block 1102 is represented by the reference vector 1107 as the amount including the direction component. The reference vector 1107 of each reference block 1108 takes a value according to a position of the reference block 1108 on the reference frame 1102. As described above, in the block matching, the reference vector of the reference block 1108 where the SAD value as the correlation value is minimum is detected as the motion vector 1104.

Thus, in the block matching, a SAD value (hereinafter, referred to as SAD value for reference block 1108 for simpler description) between each of the plurality of reference blocks 1108 set within the search range 1106 and the target block 1102 is first obtained.

Figure 14:
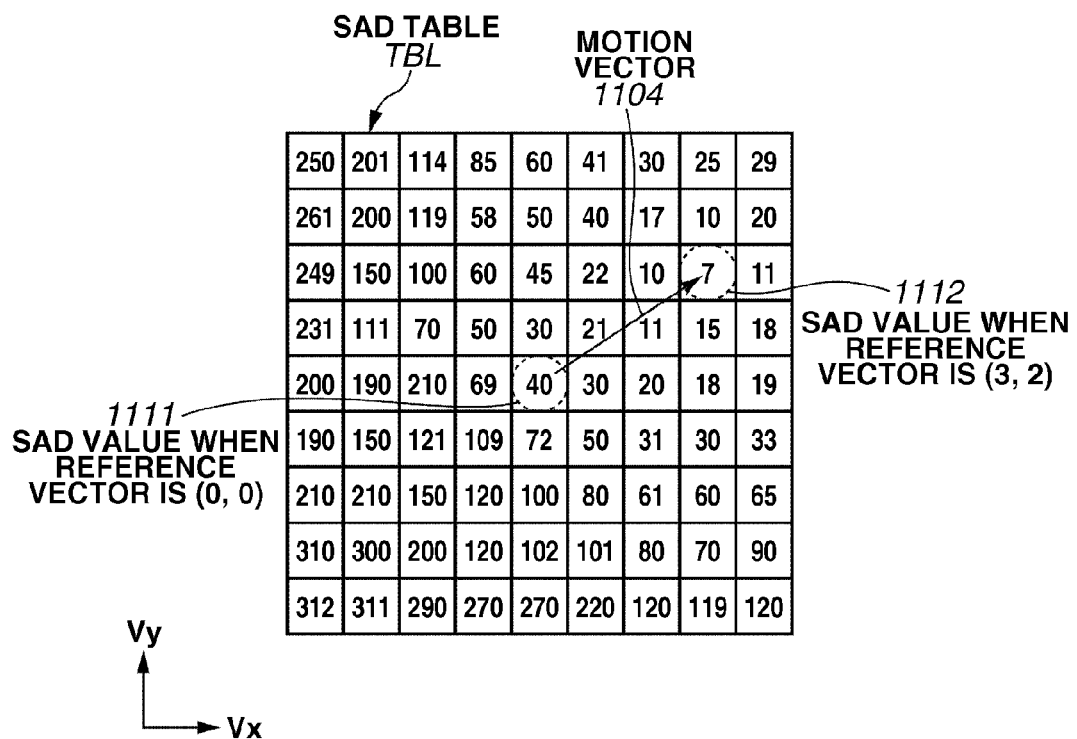
FIG. 14 is a diagram illustrating the SAD table in the block matching processing.

Then, as illustrated in FIG. 14, the obtained SAD value is stored in a memory corresponding to each of the reference vectors 1107 according to the position of each reference block 1108. Then, the motion vector 1104 can be detected by detecting, among the SAD values of all the reference blocks 1108 stored in the memory, a reference block 1108 having a minimum SAD value. Hereinafter, for simplicity, the reference vector 1107 according to the position of the reference block 1108 will be referred to as a reference vector 1107 of the reference block 1108.

A table storing correlation values (in this example, SAD values) for the respective reference blocks 1108 corresponding to the respective reference vectors 1107 according to the positions of the plurality of reference blocks 1108 set within the search range 1106 is generated as a correlation value table (correlation value map generation). In this example, since the SAD value that is the sum of absolute differences is used as the correlation value, the correlation value table will be referred to as a table of a sum of absolute differences (SAD table).

In the SAD table TBL illustrated in FIG. 14, the correlation values (in this example, SAD values) for the respective reference blocks 1108 are correlation value table elements. In the example illustrated in FIG. 14, a SAD value 1111 is a SAD value when the reference vector is the vector (0, 0). In the example illustrated in FIG. 14, a minimum value of the SAD values is "7" when the reference vector is the vector (3, 2). Accordingly, a motion vector 1104 to be obtained is (3, 2).

In the aforementioned description, the positions of the target block 1102 and the reference block 1108 mean specific arbitrary positions in the blocks, e.g., the center positions. The reference vector 1107 indicates a deviation amount (including direction) between the position of the projection image block 1109 of the target block 1102 in the reference frame 1101 and the position of the reference block 1108.

The reference vector 1107 corresponding to each reference block 1108 indicates positional deviation of each reference block 1108 from the position of the projection image block 1109 corresponding to the target block 1102 on the reference frame 1101. Thus, when the position of the reference block 1108 is specified, a value of a reference vector is specified corresponding to the position. As a result, when an address of a correlation value table element of the reference block of the SAD table 1110 in the memory is specified, a corresponding reference vector is specified.

The line determination unit 201 determines whether the motion vector has been detected in a linear object. The motion vector is removed when it is determined that the motion vector has been detected in the linear object. Otherwise, the motion vector is directly output. In the target image illustrated in FIG. 6, thirty-six (6×6) target blocks are present, and thirty-six motion vectors corresponding to the target blocks are detected by the motion vector detection unit 202. As to the eighteen target blocks located on the left half, since a linear object is present, a line is determined, and a corresponding motion vector is removed. A motion vector corresponding to the eighteen target blocks located on the right half is directly output. The present exemplary embodiment is described by omitting a right half of the object. However, it is assumed that an object other than a linear object can be detected from the right half.

An affine coefficient calculation unit 203 calculates an affine coefficient that is a coordinate transformation coefficient used for correction in each region by using motion vectors of the plurality of target blocks included in the target image (coordinate transformation coefficient calculation). As the affine coefficient calculation method, for example, the method discussed in Japanese Laid-Open Patent Application No. 2009-258868 can be used.

Next, an outline of the affine coefficient calculation method will be described.

The following formula (1) is a general formula of affine transformation.

$$\begin{pmatrix} v \\ w \end{pmatrix} = \begin{pmatrix} a b c \\ d e f \end{pmatrix} \begin{pmatrix} x \\ y \\ 1 \end{pmatrix} = \begin{pmatrix} a'x + b'y + c \\ d'x + e'y + f \end{pmatrix} \quad (1)$$

In the formula (1), v is a horizontal component of a motion vector of a target block; w is a vertical component of the motion vector of the target block; a, b, c, d, e, and f are affine coefficients; and x and y are a horizontal component and a vertical component, respectively, of the center coordinates of the target block.

A motion vector (referred to as ideal motion vector) according to an obtained affine coefficient is acquired from the obtained affine coefficient and the center coordinates of each target block. A sum $\epsilon$ of errors between the ideal vector and a motion vector obtained by observation (detection by block matching) is represented by a formula (2).

The affine coefficients are derived from estimation of the affine coefficients a to f that minimize the sum $\epsilon$ of errors, which can be performed by, for example, a least square method. Formulas (3), (4), and (5) indicate a deriving process of the affine coefficients a to f, and a result thereof.

$$Vn = \begin{pmatrix} a b c \\ d e f \end{pmatrix} \begin{pmatrix} xn \\ yn \\ 1 \end{pmatrix} \quad (2)$$

$$\epsilon n^2 = \left| Vn - \begin{pmatrix} vn \\ wn \end{pmatrix} \right|^2$$

$$\epsilon^2 = \sum \epsilon n^2$$
$$= \sum \{(a'xn + b'yn + c - vn)^2 + (d'xn + e'yn + f - wn)^2\}$$

Where $xn$=horizontal component of center coordinates of each block n $yn$=vertical component of center coordinates of each block n $vn$=horizontal component of motion vector of each block n $wn$=vertical component of motion vector of each block n $Vn$=theoretical vector in each block n obtained from affine transformation $\epsilon n$=difference (distance) between motion vector and theoretical vector in each block n $\epsilon$=sum of $\epsilon n$ From $$\frac{\partial \epsilon^2}{\partial a} = 0. \quad (3)$$
$$\frac{\partial \epsilon^2}{\partial b} = 0.$$
$$\frac{\partial \epsilon^2}{\partial c} = 0$$

$$a'x2 + b'xy + c'x = vx \quad ①$$
$$a'xy + b'y2 + c'y = vy \quad ②$$
$$a'x + b'y + c'n = v \quad ③$$

Where
n=sum of blocks $$x2 = \sum x^2 \quad (4)$$
$$xy = \sum xy$$
$$y2 = \sum y^2$$
$$x = \sum x$$
$$y = \sum y$$
$$vx = \sum vx$$
$$vy = \sum xy$$
$$v = \sum v$$

$$a = \frac{(n'y2 - y^2)(n'vx - v'x) - (n'xy - x'y)(n'vy - v'y)}{(n'x2 - x^2)(n'y2 - y^2) - (n'xy - x'y)^2}$$

$$b = \frac{(n'xy - x'y)(n'vx - v'x) - (n'x2 - x^2)(n'vy - v'y)}{(n'xy - x'y)^2(n'x2 - x^2)(n'y2 - y^2)}$$

$$c = \frac{(x'y2 - xy'y)(x'vx - v'x2) - (xy'x - x2'y)(vy'x - v'xy)}{(n'y2 - xy'y)(x2 - n'x2) - (xy'x - x2'y)(x'y - n'xy)}$$

From (1), (2), and (3) of (formula 103)

$$d = \frac{(n'y2 - y^2)(n'wx - w'x) - (n'xy - x'y)(n'wy - w'y)}{(n'x2 - x^2)(n'y2 - y^2) - (n'xy - x'y)^2} \quad (5)$$

$$e = \frac{(n'xy - x'y)(n'wx - w'x) - (n'x2 - x^2)(n'wy - w'y)}{(n'xy - x'y)^2(n'x2 - x^2)(n'y2 - y^2)}$$

$$f = \frac{(x'y2 - xy'y)(x'wx - w'x2) - (xy'x - x2'y)(wy'x - w'xy)}{(n'y2 - xy'y)(x2 - n'x2) - (xy'x - x2'y)(x'y - n'xy)}$$

Where $$wx = \sum wx$$
$$wy = \sum wy$$
$$w = \sum w$$

The affine transformation unit 207 corrects the positional deviation of the reference image by using the calculated affine coefficients.

Figure 3:
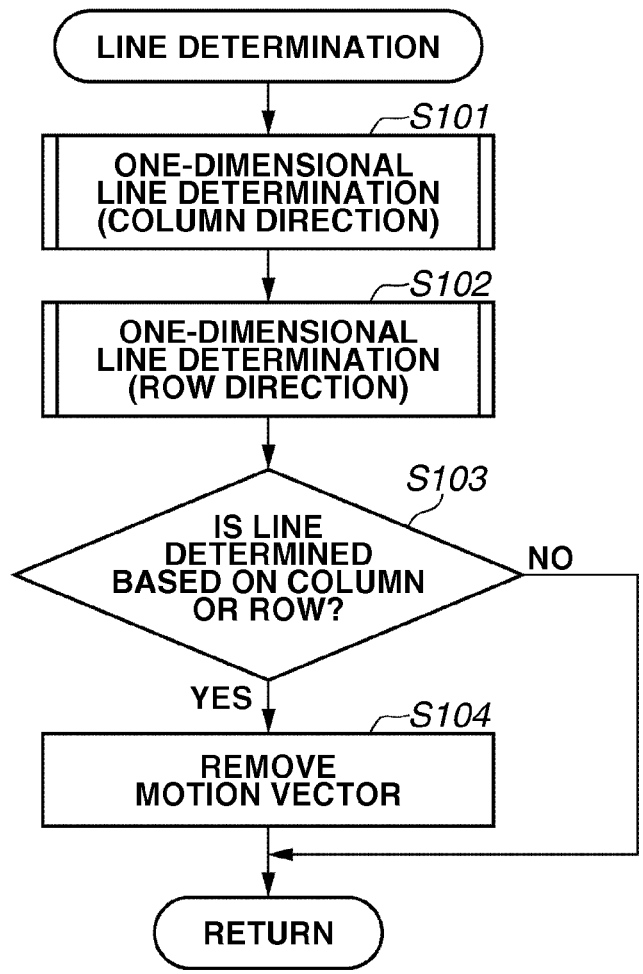
FIG. 3 is a flowchart illustrating an operation of a line determination unit according to the exemplary embodiment.

Referring to FIG. 3, an operation of the line determination unit 201 (reliability evaluation unit) will be described. In steps S101 and S102, the line determination unit 201 first performs one-dimensional line determination in a column direction and a row direction. In step S104, the line determination unit 201 removes the motion vector when a line is determined in the column direction or the row direction (YES in step S103). Otherwise, the line determination unit 201 directly outputs the motion vector (NO in step S103).

Figure 5:
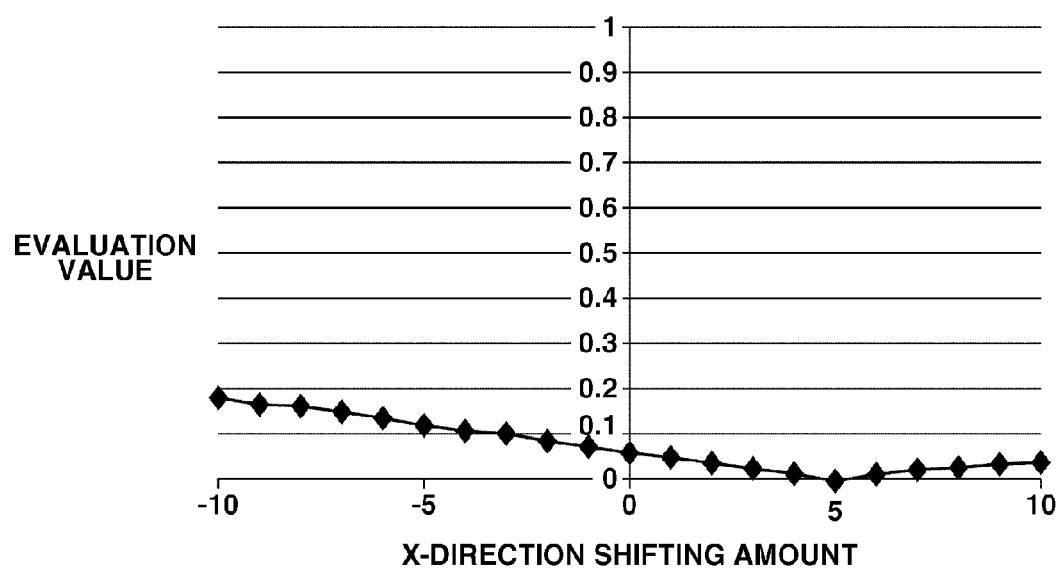
FIG. 5 is a diagram illustrating a line determination evaluation value according to the exemplary embodiment.

Referring to FIGS. 4 and 5, the one-dimensional line determination in the column direction will be described. FIG. 4 illustrates the same SAD table as that illustrated in FIG. 7, in which minimum SAD values in the columns are blackened. For example, a minimum SAD value in a column where an X-direction deviation amount is −10 is 15 of a row where a Y-direction deviation amount is 0, and a minimum SAD value in a column where an X-direction deviation amount is 3 is 2 of a row where a Y-direction deviation amount is 3. Further, the minimum SAD value of the column is normalized by a SAD average value of the column, and a value thus obtained is set as an evaluation value. For example, since a SAD average value of the column where the X-direction deviation amount is −10 is 88, an evaluation value is represented by 15/88=0.17. Since a SAD average value of the column where the X-direction deviation amount is 3 is 89, an evaluation value is represented by 2/89=0.02. FIG. 5 is a graph plotting evaluation values with respect to deviation amounts in the X direction.

In the present exemplary embodiment, the normalization is achieved by division with the column average value of the SAD values. However, the present invention is not limited to this. For example, division can be performed by a column integrated value of the SAD values, a column maximum value, or a difference value between the column maximum value and a column minimum value. Division can also be performed by an average value of SAD column minimum values corresponding to each X-direction deviation amount, an integrated value, a maximum value, or a difference value between the maximum value and a minimum value.

In the one-dimensional line determination in the column direction, when a ratio of evaluation values larger than a first threshold value and less than a second threshold value is greater than a third threshold value, it is determined as a line since the SAD table is groove-shaped. In other words, whether a distribution of evaluation values (distribution of minimum values of correlation values) is linear is determined. In the present exemplary embodiment, the first threshold value is 0, the second threshold value is 0.3, and the third threshold value is 0.8. In this SAD table, the number of evaluation values which are equal to or larger than the first threshold value, and less than the second threshold value is 21, and a ratio is 21/21=1, which is equal to or more than 0.8 of the third threshold value. Accordingly, in this case, the distribution of evaluation values is determined to be linear. A reason why the distribution of evaluation values (distribution of local minimum values of correlation values) can be determined to be linear only by counting the number of evaluation values within the range is that the distribution can be considered almost gentle in the correlation value map as illustrated in FIG. 8 in the case of capturing an image of a normal object. Thus, when the number of evaluation values obtained by the local minimum value of the correlation values within a predetermined range is equal to or larger than a predetermined number, the evaluation values are distributed in an almost overlapped manner. To more accurately identify the linear shape, a shape of a distribution of correlation values corresponding to the evaluation values only needs to be detected to identify the linear shape.

While the evaluation value with respect to the X-direction deviation amount is evaluated (first reliability) in the one-dimensional line determination in the column direction, an evaluation value with respect to the Y-direction deviation amount is evaluated (second reliability) in the one-dimensional line determination in the row direction. However, an operation is similar to that in the column direction. The calculation of the evaluation values and the determination of the linear object for each row and each column only need to be performed in one way.

The target image thus corrected is output from the image processing unit 107, and recorded in the recording medium 108. The recording medium 108 is, for example, an internal memory included in the digital camera 100, or a recording device such as a memory card or a hard disk drive (HDD) detachably attached to the digital camera 100. When deviation of the captured object image is not corrected, the image data output from the A/D conversion unit 106 only needs to be subjected to predetermined conversion processing or coding processing, to be recorded in the recording medium 108.

As described above, the image processing apparatus according to the present exemplary embodiment can correct deviation of the reference image from the target image caused by motion of the imaging apparatus that has captured the reference image, of the input target image and the reference image. Specifically, the image processing apparatus determines whether the motion vector detected in the block matching is that of the linear object, in the line determination unit. When the motion vector is that of the linear object, the motion vector is not used for correcting the positional deviation. The line determination unit determines whether the SAD table of the target motion vector is groove-shaped. The line determination unit determines that the motion vector is that of the linear object when the SAD table is groove-shaped.

Thus, even in the case of two images including the linear object image, the deviation of the object image can be properly corrected.

Hereinafter, an image processing apparatus according to a second exemplary embodiment of the present invention will be described.

A configuration of a digital camera according to the present exemplary embodiment is similar to that of the first exemplary embodiment except for a line determination unit 201. A processing flow of the line determination unit 201 is similar to that of the first exemplary embodiment illustrated in FIG. 3.

Referring to FIGS. 4 and 5, one-dimensional line determination in a column direction according to the present exemplary embodiment will be described. As in the case of the first exemplary embodiment, evaluation values illustrated in FIG. 5 are calculated from the SAD table illustrated in FIG. 4.

In the one-dimensional line determination in the column direction according to the present exemplary embodiment, when an integrated value of evaluation values is less than a fourth threshold value, it is determined as a line since the SAD table is groove-shaped. The fourth threshold value is 2. A value obtained by integrating 21 evaluation values with respect to each X-direction deviation amount in the SAD table is 1.57, which is less than the fourth threshold value 2. Thus, in this case, a line is determined.

In the present exemplary embodiment, the integrated value of the evaluation values is compared with the fourth threshold value. However, the present exemplary embodiment is not limited to this. For example, an average value among the evaluation values can be compared with a fifth threshold value.

While the evaluation value with respect to the X-direction deviation amount is evaluated in the one-dimensional line determination in the column direction, an evaluation value with respect to the Y-direction deviation amount is evaluated in the one-dimensional line determination in the row direction. However, an operation is similar to that in the column direction.

As described above, the image processing apparatus according to the present exemplary embodiment can correct deviation of the reference image from the target image caused by motion of the imaging apparatus that has captured the reference image, of the input target image and the reference image. Specifically, the image processing apparatus determines whether the motion vector detected in the block matching is that of the linear object by the line determination unit. When the motion vector is that of the linear object, the motion vector is not used for correcting the positional deviation. The line determination unit determines whether the SAD table of the target motion vector is groove-shaped. The line determination unit determines that the motion vector is that of the linear object when the SAD table is groove-shaped. The determination as to whether the SAD table of the target motion vector is groove-shaped is achieved by comparing the integrated value of the line determination evaluation values with a first threshold value.

Thus, even in the case of the linear object image, the deviation of the object image can be properly corrected. Further, since threshold comparison of the line determination evaluation values needs to be performed only once, calculation costs of the evaluation value determination can be reduced.

Hereinafter, an image processing apparatus according to a third exemplary embodiment of the present invention will be described.

A configuration of a digital camera according to the present exemplary embodiment is similar to that of the first exemplary embodiment except for the line determination unit 201. A processing flow of the line determination unit 201 is similar to that of the first exemplary embodiment illustrated in FIG. 3.

Referring to FIG. 4, one-dimensional line determination in a column direction according to the present exemplary embodiment will be described.

An evaluation value in the present exemplary embodiment is a minimum SAD value in a column.

In the one-dimensional line determination in the column direction according to the present exemplary embodiment, when a ratio of evaluation values larger than a first threshold value and less than a second threshold value is greater than a third threshold value, it is determined as a line since a SAD table is groove-shaped. For example, the first threshold value is 0, the second threshold value is 20, and the third threshold value is 0.8. In this SAD table, the number of evaluation values which is equal to or larger than the first threshold value, and less than the second threshold value is 21, and a ratio is 21/21=1, which is more than 0.8 of the third threshold value. Accordingly, in this case, a line is determined.

While the evaluation value with respect to the X-direction deviation amount is evaluated in the one-dimensional line determination in the column direction, an evaluation value with respect to the Y-direction deviation amount is evaluated in the one-dimensional line determination in the row direction. However, an operation is similar to that in the column direction.

As described above, the image processing apparatus according to the present exemplary embodiment can correct deviation of the reference image from the target image caused by motion of the imaging apparatus that has captured the reference image, of the input target image and the reference image. Specifically, the image processing apparatus determines whether the motion vector detected in the block matching is that of the linear object by the line determination unit. When the motion vector is that of the linear object, the motion vector is not used for correcting the positional deviation. The line determination unit determines whether the SAD table of the target motion vector is groove-shaped. The line determination unit determines that the motion vector is that of the linear object when the SAD table is groove-shaped. An evaluation value of the line determination is a SAD value of the groove of the SAD table.

Thus, even in the case of the linear object image, the deviation of the object image can be properly corrected. Further, since generation of line determination evaluation values can be simplified, calculation costs of the evaluation value generation can be reduced.

The exemplary embodiments of the present invention have been described. However, the present invention is not limited to the exemplary embodiments. Various changes and modifications can be made within the gist of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-200300 filed Sep. 12, 2012, which is hereby incorporated by reference herein in its entirety.

What is claimed is:

1. An image processing apparatus comprising:
a correlation value map generation unit configured to generate a correlation value map by setting a target block having a predetermined size and including a plurality of pixels, on a target image, and obtaining correlation values with a plurality of reference blocks corresponding to the target block set on a reference image different from the target image;
a detection unit configured to detect deviation between a reference block of the plurality of reference blocks having a maximum correlation with the target block from the correlation value map, and the target block, as a motion vector of the target block;
a reliability evaluation unit configured to detect, for each column or for each row of the correlation value map, a point whose correlation is a local maximum of the correlation value map, and to evaluate reliability of the motion vector by evaluating whether a distribution of the detected points, whose correlations are local maximums, is linear on the correlation value map; and a correction unit configured to correct deviation between the target image and the reference image based on the motion vector and the reliability of the motion vector.

2. The image processing apparatus according to claim 1, wherein the reliability evaluation unit calculates a ratio of presence of the evaluation value within a predetermined range, and evaluate the reliability of the motion vector based on the ratio.

3. The image processing apparatus according to claim 1, wherein the reliability evaluation unit evaluates the reliability of the motion vector based on a value obtained by integrating the evaluation value.

4. The image processing apparatus according to claim 1, wherein the reliability evaluation unit evaluates first reliability by the evaluation value calculated for each row, evaluates second reliability by the evaluation value calculated for each column, and evaluates the reliability of the motion vector based on the first reliability and the second reliability.

5. The image processing apparatus according to claim 1, wherein the motion vector detection unit does not output, among a plurality of motion vectors detected in each target block of the target image, a motion vector having reliability determined to be low by the reliability evaluation unit.

6. The image processing apparatus according to claim 1, further comprising:

an imaging unit configured to output the target image and the reference image.

7. An image processing method comprising:
generating a correlation value map by setting a target block having a predetermined size and including a plurality of pixels, on a target image, and obtaining correlation values with a plurality of reference blocks corresponding to the target block set on a reference image different from the target image;
detecting deviation between a reference block of the plurality of reference blocks having a largest correlation value with the target block from the correlation value map, and the target block, as a motion vector of the target block;
detecting, for each column or for each row of the correlation value map, a point whose correlation is a local maximum of the correlation value map;
evaluating reliability of the motion vector by evaluating whether a distribution of the detected points, whose correlations are local maximums, is linear on the correlation value map; and
correcting deviation between the target image and the reference image based on the motion vector and the reliability of the motion vector.

* * * * *